DOCUMENT POSITIONING AND EJECT DEVICE

Filed Sept. 29, 1967

INVENTORS
ALEXANDER DUNN
GEORGE T. LIVINGSTON
BY

United States Patent Office 3,450,401

Patented June 17, 1969

3,450,401

DOCUMENT POSITIONING AND EJECT DEVICE

Alexander Dunn, Clydebank, and George Turner Livingston, Dumbarton, Scotland, assignors to Burroughs Corporation, Detroit, Mich., a corporation of Michigan Filed Sept. 29, 1967, Ser. No. 671,836
Int. Cl. B65h *9/10*
U.S. Cl. 271—3 16 Claims

ABSTRACT OF THE DISCLOSURE

An apparatus for use in conjunction with read or write stations in business machines and data processing equipment uses pairs of rotatable rollers and resiliently supported balls to pick up and align documents that are randomly inserted into a document chute. One pair of rollers and balls moves the document into right-edge alignment in the read or write station and a second pair provides bottom-edge alignment of the document. A separate ball cooperating with one of the rollers ejects the document out of the read or write station upon completion of the read or write operation.

*Background of the invention*

Many well known devices have been used for handling, transporting and aligning checks, cards and other documents in accounting machines and data processing equipment. These devices commonly employ such diverse means as belts, air streams, synchronized rollers, diverters and pressure rolls to transport and to locate a document in a read or write station. These diverse means are normally characterized by their complexity and by a diffusion of parts within the machine in which they are utilized. A large number of widely scattered parts are normally required, and use of a plurality of principles is not uncommon. These known devices have accordingly been expensive to manufacture and to maintain, and have generally been inflexible in their application.

*Summary of the invention*

An object of the present invention is to provide a simplified and reliable device which may be used either in business machines or in data processing equipment for effectively aligning documents for processing and for ejecting documents after processing. Another object of the invention is to render the device in compact and substantially separate-unit form, so as to facilitate its installation at the desired station in a variety of equipment. Convenient installation of this invention in business or accounting machines provides automatic positioning of checks and similar documents for printing or magnetic ink encoding, and installation in data processing equipment provides automatic positioning of checks or cards for either "reading" or "writing."

An important aspect of the invention is the arrangement of two spaced-apart rotatable rollers and three resiliently supported balls in the proximity of a vertically disposed document chute. The two rotatable rollers are positioned on one side of a plane defined by a document inserted into the chute, and the three resiliently supported balls are disposed on the opposite side of such plane and movable laterally into and out of yieldable contact with predetermined points on the periphery of the respective rollers. Lateral movement of a ball into yieldable contact with its respective rotating roller is effective to pinch a document disposed therebetween and to transport such document in a direction determined by the point along the periphery of the rotating roller at which the roller is contacted by the ball.

Another aspect of the invention is the use of simple electrical means, including at least one switch and one solenoid, to control the lateral movement of the resiliently supported balls into contact with the rotating rollers, the energization of a first solenoid or the energizing or de-energizing action of a single solenoid being effective to move a document into the read or write station and to securely hold the document during the read or write operation, and the energization of a second solenoid or the opposite action of a single solenoid being effective to eject a document from the read or write station upon completion of a read or write operation.

*Brief description of the drawings*

These and other objects, aspects and advantages of the invention will be more clearly understood from the following description when read in conjunction with the accompanying drawings, in which.

*Detailed description of the invention*

Figure 1:
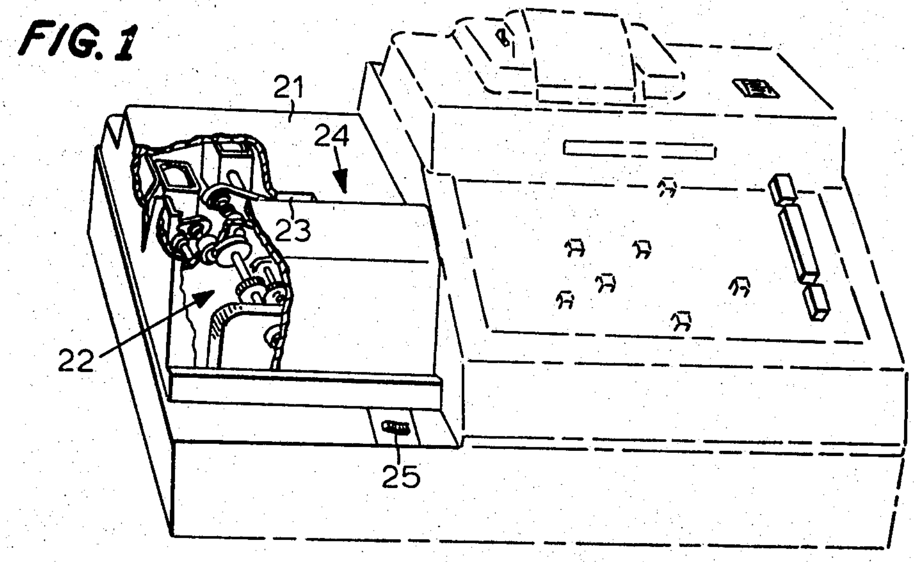
FIGURE 1 is a perspective view of a machine case adapted to accommodate the invention.
Figure 2:
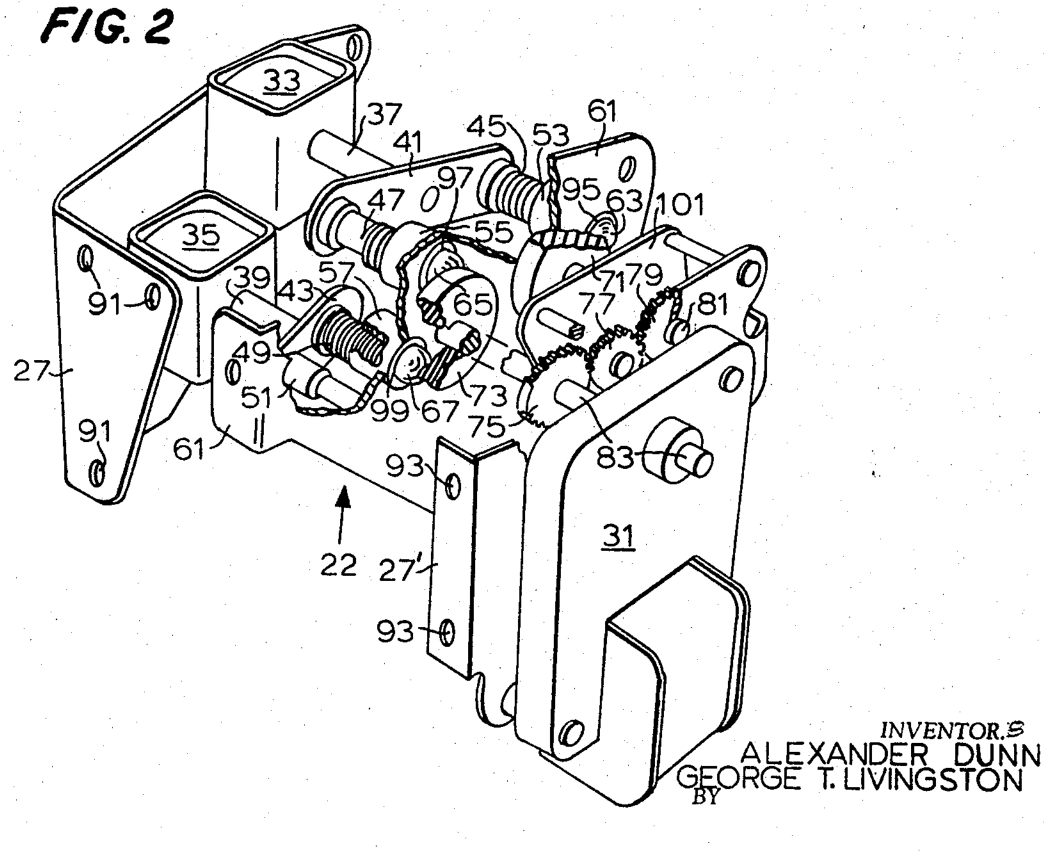
FIGURE 2 is a perspective view taken from the left front corner showing the internal structure of one embodiment of the device.

The preferred embodiment of the invention, which is designated at 22 in FIGURES 1 and 2, comprises frame members 27 and 27′ (FIGURE 2) having a fixed relationship and disposed within a case 21 (FIGURE 1) underlying a document chute 23 and leftwardly adjoining a read or write station designated at 24. The frame member 27 (FIGURE 2) provides support for solenoids 33 and 35 and for resiliently supported balls 63, 65, and 67. This frame member may be attached to an accounting machine or data processing unit in the proximity of said read or write station by means of apertures 91. The frame member 27′ provides support for an electric motor 31, spur gears 75, 77, and 79, and resilient rollers 71 and 73, and may be attached to such machine or unit by means of apertures 93. The frame members 27 and 27′ are so disposed within the case 21 that a check or other document inserted into the chute 23 will define a plane passing between the resiliently supported balls 63, 65, and 67 and the rollers 71 and 73, such plane being located in front of the resiliently supported balls and to the rear of the resilient rotatable rollers.

The solenoids 33 and 35 attached to the frame member 27 are provided with armature shafts 37 and 39, respectively, to the outer extremities of which are attached support members 41 and 43, respectively. Each of these support members is provided with a pair of spring locating pins 51 disposed on either side of and equidistant from the terminal ends of the respective armature shafts.

An auixiliary frame member 61 of the frame 27 comprises formed apertures 95 and 97 which are axially disposed of the spring locating pins 51 attached to the support member 41, and a formed aperture 99 which is axially disposed of the rightmost spring locating pin 51 attached to the support member 43. The auxiliary frame member 61 also comprises cups 53, 55, and 57 attached to the side adjacent the spring locating pins 51 and having a common axis with the formed apertures 95, 97 and 99 respectively. Springs 45 and 47 are positioned, at one end, over the spring locating pins 51 of the support member 41, and a spring 49 is positioned over the rightmost pin 51 of the support member 43. The opposite ends of the springs 45, 47, and 49, each of which has a diameter slightly less than the inner diameter of its respective cup, are retentively engaged with the cups 53, 55, and 57 respectively. The balls 63, 65, and 67, having a diameter slightly larger than the formed apertures 95, 97, and 99, are floatably disposed within the cups 53, 55, and 57, and variably positioned between the extremities of the springs 45, 47, and 49 and the formed apertures 95, 97, and 99, respectively.

The armature shafts 37 and 39 are retracted when the respective solenoids 33 and 35 are de-energized, and are projected outwardly from the solenoids when the latter are energized. When projected outwardly, the armature shafts 37 and 39, through the respective support members 41 and 43, compress the springs 45, 47, and 49 so that the balls 63, 65, and 67 are biased outwardly to be limited by the formed apertures 95, 97, and 99 of the frame member 61. When retracted by the de-energizing of their respective solenoids, the armature shafts 37 and 39 permit the springs 45, 47, and 49 to become decompressed, to thereby relieve the bias of the springs against the balls 63, 65, and 67. With the springs 45, 47, and 49 so decompressed, the corresponding balls 63, 65, and 67 are permitted to float within their respective cups 53, 55, and 57 where they assume a retracted position with respect to the formed apertures 95, 97, and 99. With the frame member 27 installed in proper relationship with the frame member 27′ in a business machine or data processing unit, the outward bias of the balls 63, 65, and 67 by the springs 45, 47, and 49 is limited by contact with the rollers 71 and 73 slightly before and instead of by the formed apertures 95, 97, and 99.

With reference to FIGURE 2 and as previously mentioned, the motor 31, the spur gears 75 ,77, and 79, and the rollers 73 and 71 are supported by the frame member 27′. The gear 75 is rigidly attached to a motor shaft 83 which extends through an aperture in the frame 27′, the gear 77 cooperates with the gear 75 and is rotatably secured to an auxiliary frame member 101, and the gear 79 cooperates with the gear 77 and is fixed to a shaft 81 which is rotatably secured to the frame 27′. The roller 73 is rigidly attached to the inner extremity of the shaft 83, and the roller 71 is rigidly attached to the inner extremity of the shaft 81. Operation of the motor 31 accordingly rotates the gear 75 and the roller 73 in a clockwise direction, and the gear 79 and the roller 71 are rotated, also in a clockwise direction, through the cooperation of gears 75 and 77.

Installation of this device in a business machine or data processing unit requires a fixed relationship between the frame members 27 and 27′ so that the resiliently supported balls 63, 65, and 67 bear a fixed predetermined relationship with the periphery of the rollers 71 and 73. This relationship must be such that the balls 63 and 65 will impinge against the inner peripheral surfaces of the rollers 71 and 73 respectively, and the ball 67 will impinge against the inner peripheral surface of the roller 73 when the armature shafts 37 and 39 respectively are projected outwardly by energization of the solenoids 33 and 35 respectively. When the relationship of the frame members 27 and 27′ is properly fixed in the business machine or data processing unit, the ball 65 will bear an impinging relationship with the roller 73 at a point substantially described by the intersection of the periphery and the upper vertical radius of the roller 73, the ball 63 will bear an impinging relationship with the roller 71 at a point substantially described by the intersection of the periphery and the three o'clock radius of the roller 71, and the ball 67 will bear an impinging relationship with the roller 73 at a point substantially described by the intersection of the periphery and the lower vertical radius of the roller 73.

Figure 6:
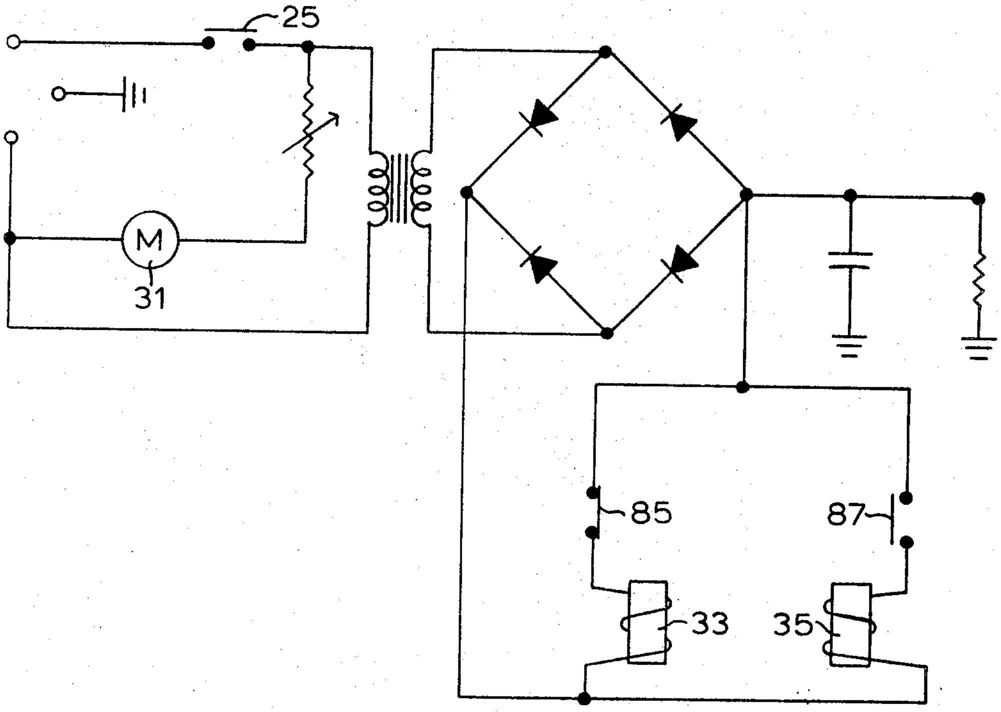
FIGURE 6 is a wiring diagram showing the circuitry and electrical elements required by one embodiment of the invention.

With reference to FIGURE 6, the solenoids 33 and 35 are shown as an integral part of circuitry which is suitable for one embodiment of the invention, such circuitry comprising also the motor 31 and switches 25, 85, and 87. The motor 31 is a constant running motor and is illustrated as an AC motor which is rotationally activated by the switch 25. It is to be understood that a DC motor could also be used. The switch 85 is biased in a closed position, and the switch 87 is biased in an open position. When the switch 25 is closed, current is supplied to the motor 31 and to the solenoid 33 through the normally closed switch 85. The motor 31 accordingly continues to operate to impart continuous clockwise rotation to the rollers 71 and 73 (FIGURE 2), until the switch 25 is opened, and the solenoid 33 is retained in its energized state to provide continuous impinging contact of the resiliently supported balls 63 and 65 against the peripheral surfaces of the rotating rollers 71 and 73 respectively, until either the switch 25 or the switch 85 is opened. The switch 87 is cooperably associated with the switch 85 and with read or write means disposed in the business machine or data processing unit, and is closably responsive to such means disposed in said business machine or data processing unit when a document has been processed to effectively energize the solenoid 35, and, through cooperation with the switch 85, to open the switch 85 to thereby de-energize the solenoid 33. De-energization of the solenoid 33 and energization of the solenoid 35 are effective to remove the impinging contact of the resiliently supported balls 63 and 65 from the rollers 71 and 73, and to provide impinging contact of the resiliently supported ball 67 against the roller 73.

Impinging contact of the ball 65 against what might be described as the twelve o'clock peripheral point on the rotating roller 73, and impinging contact of the ball 63 against the three o'clock peripheral point on the rotating roller 71 are effective to pinch a document inserted into the chute 23 and to transport such document to the right and downwardly into right-edge and bottom-edge alignment with a stop 103 (FIGURES 3, 4 and 5), such stop defining the proper registration position of the document for the read or write operation. The stop 103 is also associated with said read or write means of the business machine or data processing unit, and the arrival of a check or document into right-edge and bottom-edge alignment with such stop is effective to initiate a read or write operation in such equipment. Upon completion of a read or write operation, the switch 87 is momentarily closed to thereby energize the solenoid 35, and the switch 85 is momentarily opened to thereby de-energize the solenoid 33. The resulting impinging contact of the resiliently supported ball 67 against the six o'clock peripheral point on the rotating roller 73, and removal of the impinging contact of the balls 63 and 65 from the rollers 71 and 73 is effective to transport the document leftwardly into the chute 23 where it may be removed conveniently by the operator. Following the ejection of a processed document, the normally closed switch 85 is permitted to reclose and the normally open switch 87 is permitted to reopen to thereby re-energize the solenoid 33 and to de-energize the solenoid 35 preparatory to the insertion of a succeeding document into the document chute 23.

To briefly describe the mode of operation of the preferred embodiment of the invention to position checks at and to eject checks from a check encoding station in a business machine, the check to be encoded is dropped into the chute 23 after having first closed the switch 25. The check is pinched by the impinging contact of the ball 65 against the twelve o'clock peripheral point on the rotating roller 73 to thereby transport the check to the right, and pinched also by contact of the ball 63 against the three o'clock peripheral point on the rotating roller 71 to thereby transport the check downwardly. This combined rightward and downward movement is effective to position the check in right-edge and bottom-edge alignment with the stop 103, the impinging contact of the balls 65 and 63 against the rotating rollers 73 and 71 having been produced by the energization of the solenoid 33. Depression of amount keys and a motor bar in the keyboard of the associated business machine, after the check has been so positioned, results in the encoding of the indexed amount on the check either in magnetic or non-magnetic ink as the case might be. Upon completion of the encoding machine cycle, said means disposed within the business machine will be effective to close the switch 87 and to open the switch 85 to thereby energize the solenoid 35 and to de-energize the solenoid 33. De-energization of the solenoid 33 will remove the impinging contact of the balls 65 and 63 from the rotating rollers 73 and 71, respectively, and energization of the solenoid 35 will cause the ball 67 to be moved into impinging contact against the six o'clock peripheral point on the rotating roller 73, such contact being effective to pinch the encoded check and to move the same to the left into the chute 23 where it may be removed by the operator. Immediately upon ejection of the encoded check, delay means disposed in the business machine and cooperable with said means associated with the switch 87 will cause the normally open switch 87 to re-open and the normally closed switch 85 to re-close, to thereby de-energize the solenoid 35 and to re-energize the solenoid 33. The document positioning and eject device, and the business machine itself, are thereby made ready to receive and to align the next succeeding check of those that are to be encoded.

Figure 2A:
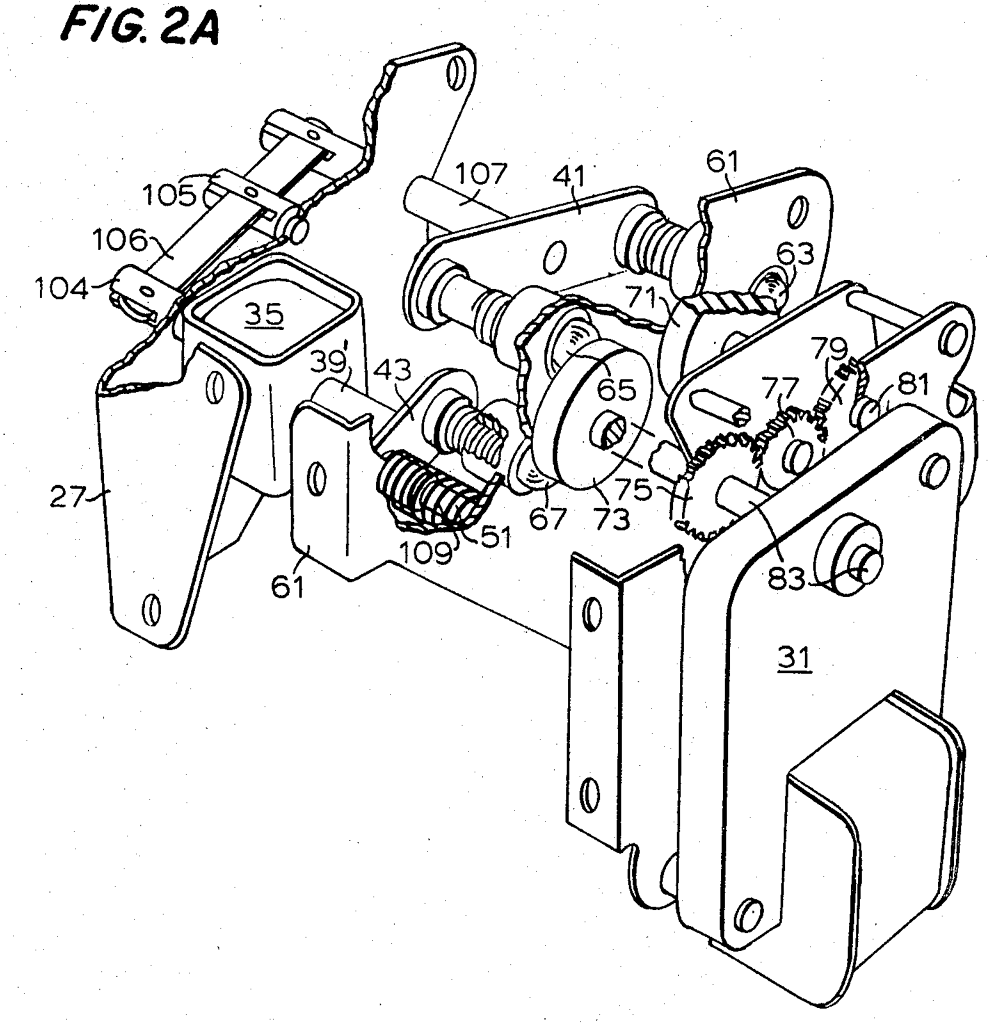
FIGURE 2A is a perspective view taken from the left front corner showing the structure of a different embodiment of the invention in which mechanical linkage is substituted for one of the electrical elements shown in FIGURE 2.

Another embodiment of the invention is shown in FIGURE 2A, in which a single solenoid 35 is employed to effectuate the above described impinging contact of the balls 65 and 63 against the rotating rollers 73 and 71, to transport a check into the rear or write station, and to also effectuate the impinging contact of the ball 67 against the rotating roller 73, to transport a processed check away from the read or write station.

In the embodiment of FIGURE 2A, a slideable shaft 107 is substituted for the solenoid 33 and the armature shaft 37 shown in FIGURE 2, said shaft 107 being slotted at its outer extremity which extends outwardly from the frame 27, the inner extremity providing support for the support member 41. Armature shaft 39′ is substituted for the armature shaft 39 shown in FIGURE 2 and comprises a slotted portion 104 extending outwardly from the frame 27. A slotted fulcrum post 105 is attached to the exterior surface of the frame 27 intermediate the slotted portion 104 of the armature shaft 39′ and the slotted outer extremity of the shaft 107. A seesaw link 106 is pivotally connected to the slotted portion 104 and to the slotted extremity of the shaft 107, and is also pivotally connected to the fulcrum post 105. A booster spring 109 is disposed on the leftmost spring locating pin 51 of the support member 43, said spring 109 being continually compressed between the support member 43 and the auxiliary frame member 61 to effectively bias the support member 43 and the extended armature shaft 39′ in a direction away from the roller 73. This bias of the support member 43 and the shaft 39′, produced by the booster spring 109, is effective to assure the clockwise rocking of the seesaw link 106 to thereby move and to hold the balls 65 and 63 into impinging contact with the rotating rollers 73 and 71 respectively, whenever the solenoid 35 is changed from an energized to a de-energized state.

In this embodiment, also, the switch 85 shown in FIGURE 6, in addition to the solenoid 33, is eliminated, and the required circuitry will provide a flow of current to the solenoid 35 only when the means disposed in the business machine or data processing unit effectively closes the switch 87 upon completion of a read or write operation, as previously described. Accordingly, this embodiment provides mechanical rather than electrical means for holding the balls 65 and 63 into impinging contact with the rollers 73 and 71 respectively, such contact being effectuated regardless of the open or closed condition of the switch 25 and regardless of whether or not the rollers 73 and 71 are in a rotational state. The balls 65 and 63 are therefore normally held in impinging contact with the rollers 73 and 71, such contact being interrupted only when the solenoid 35 is energized through the closing of the switch 87 when a document has been processed in the read or write station.

Figure 3:
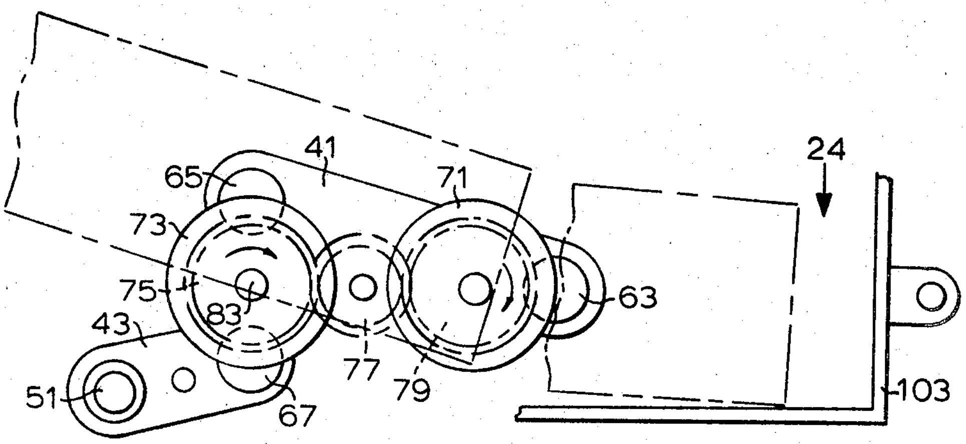
FIGURE 3 is a front view showing the relationship of resiliently supported balls and rotatable rollers, and showing also a randomly inserted document being transported into a read or write station.
Figure 4:
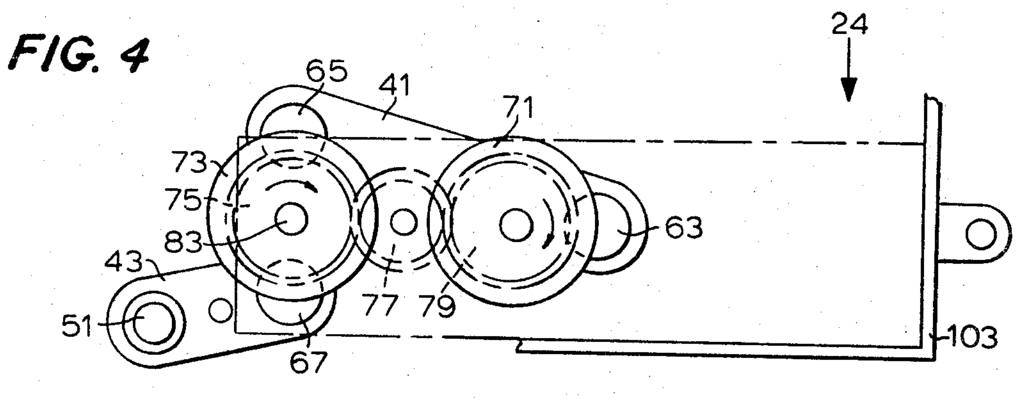
FIGURE 4 is a front view showing the relationship of balls and rollers with a document positioned in the read or write station.
Figure 5:
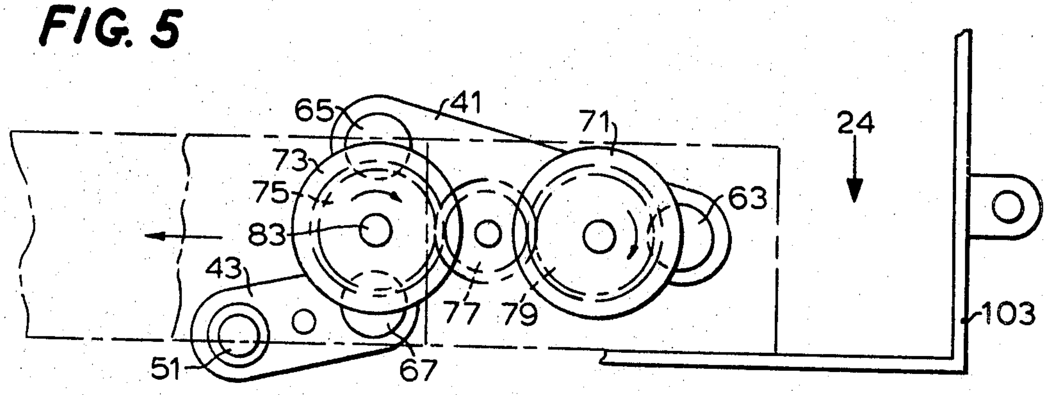
FIGURE 5 is a front view showing the relationship of balls and rollers with a document being ejected from the read or write station.

To briefly describe the mode of operation of the embodiment of FIGURE 2A when used in conjunction with an encoding station in a business machine, a check inserted into the document chute 23 (FIGURE 1), after first having closed the switch 25 to rotationally activate the rollers 73 and 71, is pinched between the balls 65 and 63 and the rotating rollers 73 and 71 (FIGURE 2A), and thereby transported to the right and downwardly into right-edge and bottom-edge alignment with the stop 103 (FIGURES 3, 4 and 5). Upon arrival of the check in the encoding station, the stop 103 cooperates with means disposed in the business machine to permit the occurrence of an encoding machine cycle, such cycle having been indexed through conventional business machine controls. Upon completion of the encoding machine cycle, during which the indexed amount or information is encoded in proper location on the check, means disposed in the business machine will momentarily close the switch 87 to energize the solenoid 35. When the solenoid 35 is energized, the ball 67 is moved into impinging contact with the six o'clock peripheral point on the rotating roller 73, and the impinging contact of the balls 65 and 63 against the rotating rollers 73 and 71 is removed through the counterclockwise rocking of the seesaw link 106 and the resulting outward sliding of the shaft 107. The encoded check is accordingly pinched between the ball 67 and the rotating roller 73 and transported out of the encoding station and into the chute 23, from which point it is removed by the operator. Since the switch 87 is biased in an open state, as previously mentioned, conventional control means disposed in said business machine will permit the switch 87 to again open shortly after the encoding cycle has terminated, to thereby remove the contact of the ball 67 against the rotating roller 73 and to re-establish contact of the balls 65 and 63 against the rotating rollers 73 and 71, such change in contacts being accomplished through de-energization of the solenoid 35 and the effect of the bias of the booster spring 109 on the support member 43, the armature shaft 39′, the seesaw link 106 and the slidable shaft 107. The embodiment of the invention is accordingly made ready to receive and to position the suceeding check of those to be encoded.

It will be understood that the details, arrangement of parts, or changes in the associated structure of the device herein described and illustrated in order to explain the nature of the invention, may be made by those skilled in the art within the principle and scope of the invention as expressed in the appended claims.

What is claimed is:

1. A paper handling device adaptable for use in a document station in a business machine or data processing unit, said device being effective for selectively directing a document into a plurality of paths leading away from said station, said device comprising:

(a) roller means disposed on one side of a plane defined by a document located in said station, said means comprising at least one rotatable roller, (b) a plurality of laterally movable and resiliently supported balls disposed on the opposite side of said plane, said balls corresponding in number to the number of paths leading away from said station into which documents are to be directed, each of said balls bearing a fixed predetermined relationship with the periphery of a rotatable roller of said roller means, (c) means for rotating said roller means in a predetermined direction, and (d) lateral moving means effective for selectively moving each of said resiliently supported balls into and out of impinging contact with its respective predetermined point on the periphery of its respective rotating roller, said direction of travel of a document away from said station being determined jointly by the direction of rotation of said rotating roller and the radius point along the periphery of said roller at which said roller is contacted by said laterally moved ball.

2. A document positioning and ejecting device for use in conjunction with a read or write station in a business machine or data processing unit, comprising:

(a) a chute providing ingress of documents into said device and said read or write station, (b) a frame attachable to said business machine or data processing unit in the proximity of said read or write station, (c) roller means rotatably attached to said frame and disposed on one side of a plane defined by said ingress of said documents, (d) a plurality of resiliently supported and laterally movable balls attached to said frame and disposed on the opposite side of said plane, each of said balls bearing a fixed predetermined relationship with said roller means, (e) means for rotating said roller means in a clockwise direction, and (f) lateral moving means effective for moving said resiliently supported balls into and out of impinging contact with said roller means, said means being effective to move at least one resiliently supported ball into impinging contact with said rotating roller means in such manner as to pinch a document inserted therebetween and to transport, align and hold said document to and in said read or write station, and effective also to move a separate resiliently supported ball into impinging contact with said roller means to eject said document from said read or write station into said chute upon completion of a read or write operation.

3. The document positioning and ejecting device defined in claim 2 wherein said frame additionally comprises:

(a) a first frame portion comprising said roller means and said means for rotating said roller means in a clockwise direction, and (b) a second frame portion comprising said plurality of resiliently supported balls and said lateral moving means, said second frame portion comprising also a frame member having a formed aperture for the retentive accommodation of each of said balls, said first and said second frame portions being attachable to suitable means disposed in said business machine or data processing unit so as to establish and to maintain said predetermined relationship of each of said resiliently supported balls with said rotatable roller means.

4. The document positioning and ejecting device defined in claim 3 wherein said means for rotating said roller means additionally comprises:

(a) circuit means connectable to an electrical wall outlet, (b) a constant running motor associated with said circuit means, and (c) a first switch associated with said circuit means and with said motor, said first switch having a first position effective for activating said motor and a second position effective for de-activating said motor.

5. The document positioning and ejecting device defined in claim 4 wherein the resilient support for each of said resiliently supported balls is provided by means of:

(a) a support member attached to said lateral moving means, said support member having a locating pin extending outwardly therefrom in the direction of said roller means, (b) a cup member attached to said frame member of said second frame portion, said cup member having a common axis with said formed aperture in said frame member, said attachment of said cup member to said frame member being on the surface remote from said plane defined by said ingress of said documents into said chute, said cup member being effective to retain said ball in variable linear relationship with said formed aperture in said frame member, and (c) a first spring means disposed between said support member and said cup member, one extremity of said spring means being positioned by said locating pin and the opposite extremity abutting against said ball encased within said cup member, said spring means having a resiliency effective to hold said ball into full engagement with said formed aperture or into impinging contact with said roller means when said lateral moving means is activated, and to permit the floating retraction of said ball from said formed aperture and from said roller means when said lateral moving means is deactivated.

6. The document positioning and ejecting device defined in claim 5 wherein:

(a) said roller means comprises at least one rotatable roller, said roller being rotationally activated by said motor, and (b) said plurality of resiliently supported balls comprises at least two laterally movable balls, a first ball cooperating with said rotating roller when activated by said lateral moving means to transport a document inserted therebetween into said read or write station and to hold said document in proper registrational position during a read or write operation, and a second ball cooperating with said rotating roller when activated by said lateral moving means to transport a processed document away from said read or write station and into said chute.

7. The document positioning and ejecting device defined in claim 5 wherein:

(a) said roller means comprises a first and a second roller, said first roller being rotationally activated by said motor and said second roller being activated by said first roller through a connecting gear train, and (b) said plurality of resiliently supported balls comprises a first, second and third laterally movable ball, said first ball cooperating with said first rotating roller when activated by said lateral moving means to transport a document inserted therebetween in the horizontal direction of said read or write station, said second ball cooperating with said second rotating rotating roller when activated by said lateral moving means to transport a document in the vertical direction of said read or write station, said first and said second balls being effective also for holding a document in proper registrational positon in said read or write station during a read or write operation, and said third ball cooperating with said first rotating roller when activated by said lateral moving means to transport a document in a horizontal direction away from said read or write station and into said chute upon completion of said read or write operation.

8. The document positioning and ejecting device defined in claim 6 wherein said lateral moving means additionally comprises:

(a) a solenoid associated with said circuit means and with said first switch, said solenoid being supportively associated also with said second resiliently supported ball, (b) linkage means associated with said solenoid and serving to couple said second resiliently supported ball with said first resiliently supported ball, (c) a second switch associated with said circuit means, with said first switch and with said solenoid, said second switch being biased in an open position and being closably responsive to means disposed in said business machine or data processing unit upon completion of a read or write operation to energize said solenoid, said energizing of said solenoid being effective to move said second resiliently supported ball into impinging contact with said rotating roller to thereby move a processed document out of said read or write station and into said chute, and (d) a second spring means associated with said solenoid and with said second resiliently supported ball, said spring means being effective through cooperation with said linkage means to move said first resiliently supported ball into impinging contact with said rotating roller when said solenoid is de-energized through the opening of said second switch by said means disposed in said business machine or data processing unit, said de-energizing of said solenoid and said movement of said first resiliently supported ball into impinging contact with said rotating roller effectively preparing said device to receive and to transport a succeeding document into said read or write station.

9. The document positioning and ejecting device defined in claim 8 wherein said predetermined relationship of each of said resiliently supported balls with said rotatable roller means is established by a fixed positioning of said lateral moving means and said first and second resiliently supported balls with respect to said rotatable roller wherein:

(a) said first ball assumes a contacting position with respect to said rotating roller substantially defined by the intersection of the periphery of said roller with such radius of said roller as falls intermediate its upper vertical and horizontal radii, said horizontal radius being adjacent said read or write station, and (b) said second ball assumes a contacting position with respect to said rotating roller substantially defined by the intersection of the periphery and lower vertical radius of said roller, said impinging contact of said first ball with said rotating roller thereby being effective to pinch a document inserted therebetween and to transport said document to the right and downwardly into said read and write station, and said impinging contact of said second ball with said rotating roller thereby being effective to transport a document positioned therebetween to the left and away from said read or write station.

10. The document positioning and ejecting device defined in claim 7 wherein said lateral moving means additionally comprises:

(a) a solenoid associated with said circuit means and with said first switch, said solenoid being supportively associated also with said third resiliently supported ball, (b) linkage means associated with said solenoid and serving to couple said third resiliently supported ball with said first and said second resiliently supported balls, (c) a second switch associated with said circuit means, with said first switch and with said solenoid, said second switch being biased in an open position and beind closely responsive to means disposed in said business machine or data processing unit upon completion of a read or write operation to energize said solenoid, said energizing of said solenoid being effective to move said third resiliently supported ball into impinging contact with said first rotating roller to thereby move a processed document out of said read or write station and into said chute, and (d) a second spring means associated with said solenoid and with said third ball, said spring means being effective through cooperation with said linkage means to move said first and said second balls into impinging contact with said first and said second rotating rollers, respectively, when said solenoid is de-energized through the opening of said second switch by said means disposed in said business machine or data processing unit, said de-energizing of said solenoid and said movement of said first and said second balls into impinging contact with said first and said second rotating rollers effectively preparing said device to receive and to transport a succeeding document into said read or write station.

11. The document positioning and ejecting device defined in claim 10 wherein said predetermined relationship of each of said resiliently supported balls with said rotatable roller means is established by a fixed positioning of said lateral moving means and of said first, second, and third resiliently supported balls with respect to said first and said second rotating rollers wherein:

(a) said first ball assumes a contacting position with respect to said first rotating roller substantially defined by the intersection of the periphery and upper vertical radius of said first roller, (b) said second ball assumes a contacting position with respect to said second rotating roller substantially defined by the intersection of the periphery and horizontal radius of said second roller, said horizontal radius being adjacent said read or write station, and (c) said third ball assumes a contacting position with respect to said first rotating roller substantially defined by the intersection of the periphery and lower vertical radius of said first roller, said impinging contact of said first ball with said first roller thereby being effective to pinch a document inserted therebetween and to transport said document in the horizontal direction of said read or write station, said contact of said second ball with said second roller thereby being effective to transport said document in the vertical direction of said read or write station, and said contact of said third ball with said first roller thereby being effective to transport a processed document in a horizontal direction away from said read or write station.

12. The document positioning and ejecting device defined in claim 6 wherein said lateral moving means additionally comprises:

(a) a first solenoid associated with said circuit means and with said first switch, said first solenoid being supportively associated also with said first resiliently supported ball, (b) a second switch associated with said circuit means and with said first solenoid, said second switch being biased in a closed position to thereby energize said first solenoid when said first switch is closed, said energizing of said first solenoid being effective to move said first ball into impinging contact with said rotating roller to thereby pinch a document inserted therebetween and to move said document into said read or write station, (c) a second solenoid associated with said circuit means and with said first switch, said second solenoid being supportively associated also with said second resiliently supported ball, and (d) a third switch associated with said circuit means, with said first and second switches, and with said second solenoid, said third switch being biased in an open position and being also closably responsive to means disposed in said business machine or data processing unit upon completion of a read or write operation to momentarily energize said second solenoid, said closing of said third switch being effective to open said second switch to momentarily deenergize said first solenoid, said energizing of said second solenoid being effective to move said second ball into impinging contact with said rotating roller to thereby move a processed document out of said read or write station and into said chute.

13. The document positioning and ejecting device defined in claim 7 wherein said lateral moving means additionally comprises:

(a) a first solenoid associated with said circuit means and with said first switch, said first solenoid being supportively associated also with said first and said second resiliently supported balls, (b) a second switch associated with said circuit means and with said first solenoid, said second switch being biased in a closed position to thereby energize said first solenoid when said first switch is closed, said energizing of said first solenoid being effective to move said first and said second balls into impinging contact with said first and said second rollers, respectively, to thereby pinch a document inserted therebetween and to move said document into said read or write station, (c) a second solenoid associated with said circuit means and with said first switch, said second solenoid being supportively associated also with said third resiliently supported ball, and (d) a third switch associated with said circuit means, with said first and second switches, and with said second solenoid, said third switch being biased in an open position and being also closably responsive to means disposed in said business machine or data processing unit upon completion of a read or write operation to momentarily energize said second solenoid, said closing of said third switch being effective to open said second switch to momentarily de-energize said first solenoid, said energizing of said second solenoid being effective to move said third ball into impinging contact with said first rotating roller to thereby move a processed document out of said read or write station and into said chute.

14. The document positioning and ejecting device defined in claim 12 wherein said biasing of said second switch in closed position and said biasing of said third switch in open position are effective through said impinging contact of said first resiliently supported ball against said rotating roller to hold a positioned document in proper registrational position in said read or write station in said business machine or data processing unit throughout a read or writer operation.

15. The document positioning and ejecting device defined in claim 13 wherein said biasing of said second switch in closed position and said biasing of said third switch in open position are effective through said impinging contact of said first and said second resiliently supported balls against said first and said second rotating rollers, respectively, to hold a positioned document in proper registrational position in said read or write station in said business machine or data processing unit throughout a read or write operation.

16. A document aligning and ejecting device for use in the proximity of a document chute in a business machine or data processing unit, said chute providing ingress of a document into a read or write station within said machine or said unit, said device comprising:

(a) a first frame member, (b) a second frame member juxtaposed in predetermined relationship with said first frame member, (c) a constant running motor supported by said first frame member, (d) a first gear and roller supported by said first frame member, said first gear and roller being rotationally activated by said constant running motor, (e) an intermediate gear supported by said first frame member, said intermediate gear being cooperatively associated with said first gear and roller, (f) a second gear and roller supported by said first frame member, said second gear and roller being rotationally activated by said constant running motor through said intermediate gear, (g) a first solenoid supported by said second frame member, (h) a second solenoid supported by said second frame member and juxtaposed in predetermined relationship with said first solenoid, (i) stop means defining the proper positioning of a document in said read or write station, (j) a first resiliently biased ball associated with said first solenoid and cooperable with said roller of said first gear and roller to pinch a document introduced therebetween and to transport said document in the horizontal direction of said stop means and said read or write station, (k) a second resiliently biased ball associated with said first solenoid and cooperable with said roller of said second gear and roller to pinch a document inserted therebetween and to transport said document in the vertical direction of said stop means and said read or write station, (l) a third resiliently biased ball associated with said second solenoid and cooperable with said roller of said first gear and roller to transport a document inserted therebetween in a horizontal direction away from said stop means and said read or write station, (m) circuit means associated with said constant running motor and with said first and said second solenoids, (n) a first switch associated with said constant running motor and effective for rotationally activating said motor and said first and said second gear and roller, said first switch being effective also for supplying current to said circuit means, (o) a second switch associated with said first solenoid and with said circuit means, said second switch being biased in a closed position to energize said first solenoid when said first switch is closed, said energizing of said first solenoid being effective to activate said first and said second resiliently biased balls into cooperating contact with said first and said second roller of said first and second gear and roller to thereby transport a document inserted therebetween into contact with said stop means, and (p) a third switch associated with said second solenoid and cooperable with said second switch, said third switch being biased in an open position and being also closably responsive to suitable means disposed in said business machine or data processing unit to energize said second solenoid when a document has been processed, said closing of said third switch being effective to open said second switch to thereby de-energize said first solenoid, said energizing of said second solenoid and de-energizing of said first solenoid being effective to transport said processed document away fro msaid stop means and said read or write station into said chute.

References Cited

UNITED STATES PATENTS 2,910,293 10/1959 Kelchner ------------ 271—52

EDWARD A. SROKA, *Primary Examiner.*

U.S. Cl. X.R.

271—58